Feb. 1, 1949.  L. S. ROESLER  2,460,364
MIXING BOWL GUARD
Filed July 18, 1946

Inventor
Layton S. Roesler

By Clarence A. O'Brien
and Harvey B. Jacobson
Attorneys

Patented Feb. 1, 1949

2,460,364

UNITED STATES PATENT OFFICE 2,460,364

MIXING BOWL GUARD

Layton S. Roesler, Claflin, Kans.

Application July 18, 1946, Serial No. 684,592

1 Claim. (Cl. 259—1)

This invention relates to improvements in mixer bowl guards.

An object of the invention is to provide an improved guard which will be adapted to be positioned over the edge of a mixing bowl to provide a cushioning means upon which a paddle or a spoon may be knocked to remove the excess batter or mixture from the paddle or spoon into the bowl.

Another object of the invention is to provide an improved cushioning guard adapted to be supported upon the edge of a mixing bowl either for an electric mixer or a bowl used with a mechanical mixer such as an egg beater, or a spoon may be knocked on said guard to remove the excess mixture or batter therefrom.

A further object of the invention is to provide an improved rubber guard for the edge of a mixing bowl upon which a mixing paddle or spoon may be knocked for removing the excess batter or mixture therefrom without the possibility of chipping the edge of the bowl in which the mixture is contained.

Another object of the invention is to provide an improved rubber guard member adapted to be positioned on the edge of a mixing bowl and upon which the paddle or a spoon may be knocked while removing the excess mixture or batter therefrom without injury to the paddle or spoon or to the edge of the mixing bowl, said device being highly efficient in operation and relatively inexpensive to manufacture and produce.

Other objects will appear as the description proceeds.

In the accompanying drawings which form a part of this application,

Like characters of reference are used throughout the following specification and the accompanying drawings to designate corresponding parts.

Figure 2:
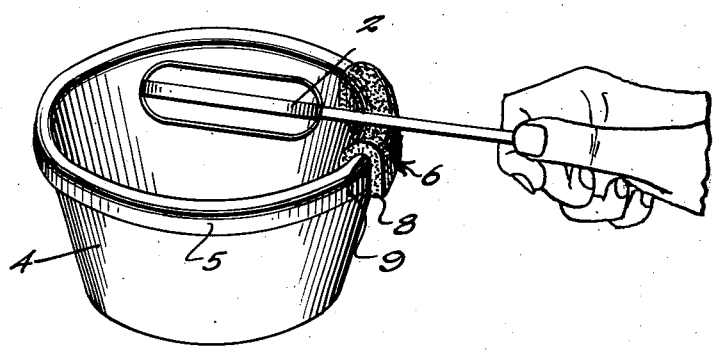
Figure 2 is a perspective view of a mixing bowl showing the improved guard upon the upper rim thereof and a mixing paddle being engaged or knocked upon said guard to remove the excess batter or mixture therefrom.
Figure 3:
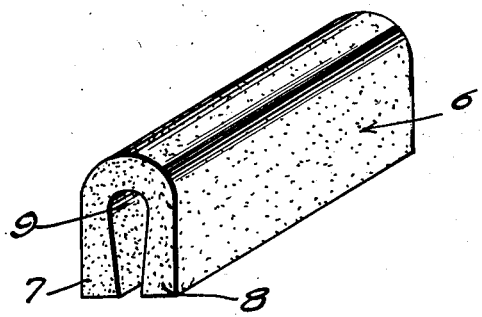
Figure 3 is a perspective view of the improved rubber mixer bowl guard.
Figure 1:
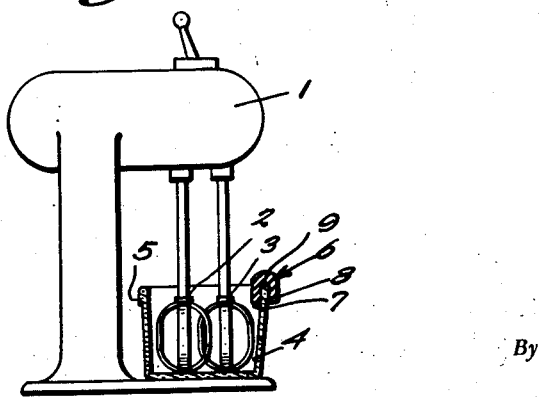
Figure 1 is a side elevation of an electric mixer showing a bowl equipped with the improved guard in section supported upon said mixer.

In carrying out the invention, there is provided an electric mixer of any desired type being designated generally by the reference numeral 1 and including the two rotary mixing paddles 2 and 3. The mixing bowl 4 is provided with a bead or flange 5 about its upper end, and is adapted to support the inverted U-shaped rubber guard member 6, as clearly shown in Figure 2 of the drawings.

The guard member 6 will be preferably formed of rubber which may be either sponge rubber or a soft semi-pliable rubber and will be of inverted U-shape formation provided with the depending sides 7 and 8, which will be slightly thickened at their terminal ends. The groove 9 formed between the two adjacent spaced sides 7 and 8 will be wider at the upper end of the groove than at the lower end thereof, whereby the said guard 6 may be readily placed over the upper edge of a mixing bowl, as clearly shown in the drawings.

The formation of the guard 6 being such that it will readily assume the contour of the rim of the bowl, and being conformable therewith will readily grasp the opposite sides of the bowl to support itself thereon until deliberately removed.

It has been found that when a person mixes a batter or a mixture within a mixing bowl with a spoon or egg beater, or with an electric mixer, that it is desirable to knock the beater or paddle on the edge of the bowl to remove the excess batter or mixture, and in so doing, many times the mixing bowl is either cracked or chipped thereby ruining the same for further use. It is obvious that the purpose of this invention is to prevent such injury to the mixing bowl, and also permitting the paddle to be engaged with the guard much more severely to better clean the paddle or spoon, than is possible to knock the paddle or spoon upon the edge of the bowl were the guard not positioned thereon.

From the foregoing description, it will be apparent that there has been devised a highly efficient form of rubber guard for the upper surface of a mixing bowl, which will permit the efficient removal of the batter or mixture from the paddle or from a spoon when used, said guard being positive in operation, yet relatively inexpensive to manufacture and produce.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

In combination with a mixing bowl, an inverted elongated U-shaped resilient guard therefor adapted to be clipped over the edge of said bowl for knocking the mixer paddle to remove excess batter therefrom, the legs of said guard being smooth on the inner surface and progressively thickening towards the outer free ends thereof and forming a central arcuate bowl edge engaging surface, and converging inner bowl side gripping surfaces.

LAYTON S. ROESLER.

REFERENCES CITED

The following references are of record in the file of this patent:

UNITED STATES PATENTS

| Number | Name | Date |
| --- | --- | --- |
| 369,085 | Tyler | Aug. 30, 1887 |
| 845,777 | Grossman | Mar. 5, 1907 |
| 1,878,963 | Hilgers | Sept. 20, 1932 |
| 2,142,963 | De Huff | Jan. 3, 1939 |

FOREIGN PATENTS

| Number | Country | Date |
| --- | --- | --- |
| 206,785 | Great Britain | Nov. 15, 1923 |